(12) United States Patent
Rayev et al.

(10) Patent No.: US 12,197,306 B2
(45) Date of Patent: Jan. 14, 2025

(54) DISTRIBUTING STORAGE PERFORMANCE METRICS RECORDING WORK ACROSS STORAGE APPLIANCES OF A STORAGE CLUSTER

(71) Applicant: Dell Products L.P., Round Rock, TX (US)

(72) Inventors: Alexander Rayev, Hopedale, MA (US); Rajesh Kumar Gandhi, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 380 days.

(21) Appl. No.: 17/575,985

(22) Filed: Jan. 14, 2022

(65) Prior Publication Data
US 2023/0229579 A1 Jul. 20, 2023

(51) Int. Cl.
*G06F 11/34* (2006.01)
*G06F 16/11* (2019.01)
*G06F 16/17* (2019.01)
*G06F 16/182* (2019.01)

(52) U.S. Cl.
CPC ........ *G06F 11/3409* (2013.01); *G06F 16/113* (2019.01); *G06F 16/1734* (2019.01); *G06F 16/182* (2019.01)

(58) Field of Classification Search
CPC .............. G06F 11/3409; G06F 16/113; G06F 16/1734; G06F 16/182; G06F 3/0608
See application file for complete search history.

(56) References Cited

U.S. PATENT DOCUMENTS

| | | | | |
|---|---|---|---|---|
| 8,793,527 | B1* | 7/2014 | Franks | G06F 3/0659 |
| | | | | 709/219 |
| 10,091,297 | B1* | 10/2018 | Zhao | G06F 16/214 |
| 11,157,382 | B2 | 10/2021 | Yu et al. | |
| 11,709,618 | B2* | 7/2023 | Nagarajegowda | G06F 3/0604 |
| | | | | 711/154 |
| 2006/0168156 | A1* | 7/2006 | Bae | H04L 67/1001 |
| | | | | 709/220 |
| 2013/0275543 | A1* | 10/2013 | Jain | H04L 67/568 |
| | | | | 709/213 |
| 2013/0275582 | A1* | 10/2013 | Gedam | H04L 41/0213 |
| | | | | 709/224 |
| 2016/0323375 | A1* | 11/2016 | Shanley | H04L 41/122 |
| 2021/0224137 | A1* | 7/2021 | Martin | G06F 3/0689 |
| 2022/0129173 | A1 | 4/2022 | Martin et al. | |
| 2022/0137885 | A1 | 5/2022 | Zakharkin et al. | |

* cited by examiner

*Primary Examiner* — Manuel A Rivera Vargas
(74) *Attorney, Agent, or Firm* — BainwoodHuang (57) ABSTRACT

A technique of processing storage cluster performance metrics involves obtaining access to performance metrics from storage appliances of a storage cluster, the performance metrics identifying performance for storage objects managed by the storage appliances. The technique further involves, after access to the performance metrics is obtained, disregarding a duplicate set of performance metrics for a storage object that migrates from a first storage appliance of the storage cluster to a second storage appliance of the storage cluster. The technique further involves, after the duplicate set of performance metrics is disregarded, archiving the performance metrics to an archive. After archiving the performance metrics to the archive, the technique may provide a performance analysis based on the performance metrics from the archive as well as adjust operation of the storage cluster according to the performance analysis.

20 Claims, 6 Drawing Sheets

DISTRIBUTING STORAGE PERFORMANCE METRICS RECORDING WORK ACROSS STORAGE APPLIANCES OF A STORAGE CLUSTER

BACKGROUND

Data storage systems perform data storage operations on behalf of host computers. Such a data storage system may include storage processors (SPs) and backend storage which manage host data via virtual machines (VMs), virtual volumes (VVOLs), logical storage units (LUNs), etc.

Some data storage systems include multiple storage appliances arranged as a storage cluster. During operation, a VM, a VVOL, or a LUN may migrate from one storage appliance to another within the storage cluster.

SUMMARY

During operation of the above-identified storage cluster, the storage cluster may record various storage performance metrics into a central database. Such metrics may include access rates (e.g., input/output operations per second or IOPS), storage capacity, as well as other operating parameters. Accordingly, such metrics may then be post-processed to provide insights to the operation of the storage cluster (e.g., to enable a human operator to identify performance issues, to confirm compliance with a service level agreement, to identify locations for new storage objects, and so on).

Unfortunately, there are deficiencies to simply recording performance metrics for the storage cluster into a central database. For example, the conventional architecture of simply using a central database to hold all of the storage performance metrics does not scale well. Rather, all of the compute and storage resources associated with updating and maintaining the central database must reside in one location.

In contrast to the conventional architecture of simply recording performance metrics for the storage cluster into a central database, improved techniques are directed distributing storage performance metrics recording work across multiple storage appliances of a storage cluster. For example, each storage appliance may individually record appliance-specific performance metrics relating to locally owned (or managed) storage objects into a local appliance database. There may also be a primary appliance that records cluster performance metrics relating to the overall cluster into a cluster database. Such distribution of metrics recording across the multiple storage appliances provides better load balancing and improves scalability.

In accordance with certain improved techniques, a bulk metrics service provided by specialized circuitry periodically exports the recorded performance metrics from the local appliance databases and the cluster database into an archive. For example, the bulk metrics service may wake up every five minutes to access the databases in order to export newly recorded metrics from the databases to the archive. As a result, the archived metrics may be analyzed with an aim of improving cluster operation and/or performance. Along these lines, a human administrator may run a script that accesses the archived metrics to graphically plot a history of cluster operation over a period time. Other operations may be performed which modify/improve operation of the cluster based on the insights.

It should be appreciated that, without certain safeguards, particular bulk metrics service operations may cause the archived metrics to inaccurately describe cluster operation. For example, suppose that as the cluster performs an object migration operation in which a particular object such as a VM or a VVOL migrates (or moves) from a source appliance to a destination appliance. During such operation, the metrics associated with that particular object also migrate from the source appliance to the destination appliance.

Further suppose that, during the object migration operation, the bulk metrics service wakes up and accesses the databases in order to export newly recorded metrics from the databases to the archive. In such a situation, it is possible for the bulk metrics service to export the metrics for the migrating object from the local appliance database of the source appliance as well as the local appliance database of the destination appliance. That is, the metrics for the associated with the particular object are stored in the archive twice. Since the archive now includes duplicate metrics, a graphical plot of the history for the particular object will inaccurately show multiple data points because of the object migration.

To prevent object metric duplicates, it is possible to perform deduplication on the archive (i.e., a scan for copies of the same metrics), but such deduplication requires additional resources and still may not guarantee that all metric duplicates will be eliminated. Another alternative is to use locks on the databases, but use of locks may create delays (e.g., due to contention for the databases) and thus impose a heavy impact on performance.

An improved technique for processing storage cluster performance metrics utilizes a migration status table that tracks the progress of storage object migrations across storage appliances of a storage cluster. Migration status information within the migration status table may dictate whether to disregard certain performance metrics from a particular storage appliance in order to avoid duplicate sets of performance metrics due to storage object migration. Moreover, such a technique may utilize a snapshot of the migration status table rather than the migration status table itself, e.g., to prevent contention events, to avoid data inaccuracies/inconsistencies, etc.

One embodiment is directed to a method of processing storage cluster performance metrics. The method includes obtaining access to performance metrics from storage appliances of a storage cluster, the performance metrics identifying performance for storage objects managed by the storage appliances. The method further includes, after access to the performance metrics is obtained, disregarding a duplicate set of performance metrics for a storage object that migrates from a first storage appliance of the storage cluster to a second storage appliance of the storage cluster. The method further includes, after the duplicate set of performance metrics is disregarded, archiving the performance metrics to an archive.

Another embodiment is directed to electronic circuitry which includes memory and control circuitry coupled to the memory. The memory stores instructions which, when carried out by the control circuitry, cause the control circuitry to perform a method of:
  (A) obtaining access to performance metrics from storage appliances of a storage cluster, the performance metrics identifying performance for storage objects managed by the storage appliances,
  (B) after access to the performance metrics is obtained, disregarding a duplicate set of performance metrics for a storage object that migrates from a first storage appliance of the storage cluster to a second storage appliance of the storage cluster, and (C) after the duplicate set of performance metrics is disregarded, archiving the performance metrics to an archive.

Yet another embodiment is directed to a computer program product having a non-transitory computer readable medium which stores a set of instructions to process storage cluster performance metrics. The set of instructions, when carried out by computerized circuitry, causes the computerized circuitry to perform a method of:

(A) obtaining access to performance metrics from storage appliances of a storage cluster, the performance metrics identifying performance for storage objects managed by the storage appliances;

(B) after access to the performance metrics is obtained, disregarding a duplicate set of performance metrics for a storage object that migrates from a first storage appliance of the storage cluster to a second storage appliance of the storage cluster; and (C) after the duplicate set of performance metrics is disregarded, archiving the performance metrics to an archive.

In some arrangements, the storage cluster maintains a migration status table that tracks progress of storage object migrations within the storage cluster. Additionally, disregarding the duplicate set of performance metrics for the storage object includes:

(i) accessing a storage object migration entry corresponding to the storage object from the migration status table, the storage object migration entry identifying a migration status of the storage object, and (ii) disregarding the duplicate set of performance metrics for the storage object based on the migration status identified by the storage object migration entry.

In some arrangements, the first storage appliance stores a first set of performance metrics for the storage object that migrates from the first storage appliance to the second storage appliance. Additionally, the second storage appliance stores a second set of performance metrics for the storage object that migrates from the first storage appliance to the second storage appliance. Furthermore, disregarding the duplicate set of performance metrics for the storage object based on the migration status identified by the storage object migration entry includes ignoring, as the duplicate set of performance metrics for the storage object, one of the first set of performance metrics and the second set of performance metrics based on the migration status identified by the storage object migration entry.

In some arrangements, the storage object migration entry includes a migration status field that defines (i) a pending state when the storage object is in the process of migrating from the first storage appliance to the second storage appliance, and (ii) a success state when the storage object has completed migration from the first storage appliance to the second storage appliance. Additionally, ignoring one of the first set of performance metrics and the second set of performance metrics includes:

(i) retrieving the first set of performance metrics from the first storage appliance and neglecting the second set of performance metrics from the second storage appliance when the status field of the storage object migration entry defines the pending state, and (ii) retrieving the second set of performance metrics from the second storage appliance and neglecting the first set of performance metrics from the first storage appliance when the status field of the storage object migration entry defines the success state.

In some arrangements, accessing the storage object migration entry corresponding to the storage object from the migration status table includes:

(i) creating a snapshot of the migration status table, and (ii) reading the storage object migration entry from the snapshot of the migration status table.

In some arrangements, the first storage appliance manages a first group of storage objects and maintains a first group of performance metrics identifying performance for the first group of storage objects. Additionally, the second storage appliance manages a second group of storage objects and maintains a second group of performance metrics identifying performance for the second group of storage objects. Furthermore, obtaining access to the performance metrics from the storage appliances of the storage cluster includes acquiring access to the first group of performance metrics maintained by the first storage appliance for the first group of storage objects and the second group of performance metrics maintained by the second storage appliance for the second group of storage objects.

In some arrangements, the first group of storage objects includes a first group of virtual machines. Additionally, the first storage appliance includes (i) first storage processing circuitry that runs the first group of virtual machines and (ii) a first storage array. Furthermore, the second group of storage objects includes a second group of virtual machines. Also, the second storage appliance includes (i) second storage processing circuitry that runs the second group of virtual machines and (ii) a second storage array. Additionally, acquiring access includes obtaining access to (i) the first group of performance metrics from the first storage appliance, the first group of performance metrics identifying performance of the first group of virtual machines, and (ii) the second group of performance metrics from the second storage appliance, the second group of performance metrics identifying performance of the second group of virtual machines.

In some arrangements, the first group of storage objects includes a first group of virtual volumes. Additionally, the first storage appliance includes (i) first storage processing circuitry and (ii) a first storage array that stores the first group of virtual volumes. Furthermore, the second group of storage objects includes a second group of virtual volumes. Also, the second storage appliance includes (i) second storage processing circuitry and (ii) a second storage array that stores the second group of virtual volumes. Additionally, acquiring access includes obtaining access to (i) the first group of performance metrics from the first storage appliance, the first group of performance metrics identifying performance of the first group of virtual volumes, and (ii) the second group of performance metrics from the second storage appliance, the second group of performance metrics identifying performance of the second group of virtual volumes.

In some arrangements, the method further includes, after archiving the performance metrics to the archive, providing a performance analysis based on the performance metrics from the archive.

In some arrangements, the method further includes adjusting operation of the storage cluster according to the performance analysis.

In some arrangements, the performance analysis includes a storage appliance loading assessment. Additionally, adjusting the operation of the storage cluster includes rebalancing the storage objects across the storage appliances based on the storage appliance loading assessment.

In some arrangements, the performance analysis includes a storage appliance resource assessment. Additionally, adjusting the operation of the storage cluster includes locating (or placing) a new storage object among the storage appliances based on the storage appliance resource assessment.

It should be understood that, in the cloud context, at least some circuitry (e.g., hosts, backup sites, etc.) is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, componentry, computer program products, and so on. Some embodiments are directed to various methods, electronic components and circuitry which are involved in distributing storage performance metrics recording work across storage appliances of a storage cluster.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Improved techniques for processing storage cluster performance metrics distribute the work of recording storage cluster performance across storage appliances of a storage cluster. Certain techniques utilize a migration status table that tracks the progress of storage object migrations across storage appliances of a storage cluster. Migration status information within the migration status table may dictate whether to disregard certain performance metrics from a particular storage appliance in order to avoid duplicate sets of performance metrics due to storage object migration. Moreover, such a technique may utilize a snapshot of the migration status table rather than the migration status table itself, e.g., to prevent contention events, to avoid data inaccuracies, etc. With duplicate sets of performance metrics avoided, a performance analysis may be competently based on the exported performance metrics and operation of the storage cluster may be reliably adjusted according to the performance analysis.

Figure 1:
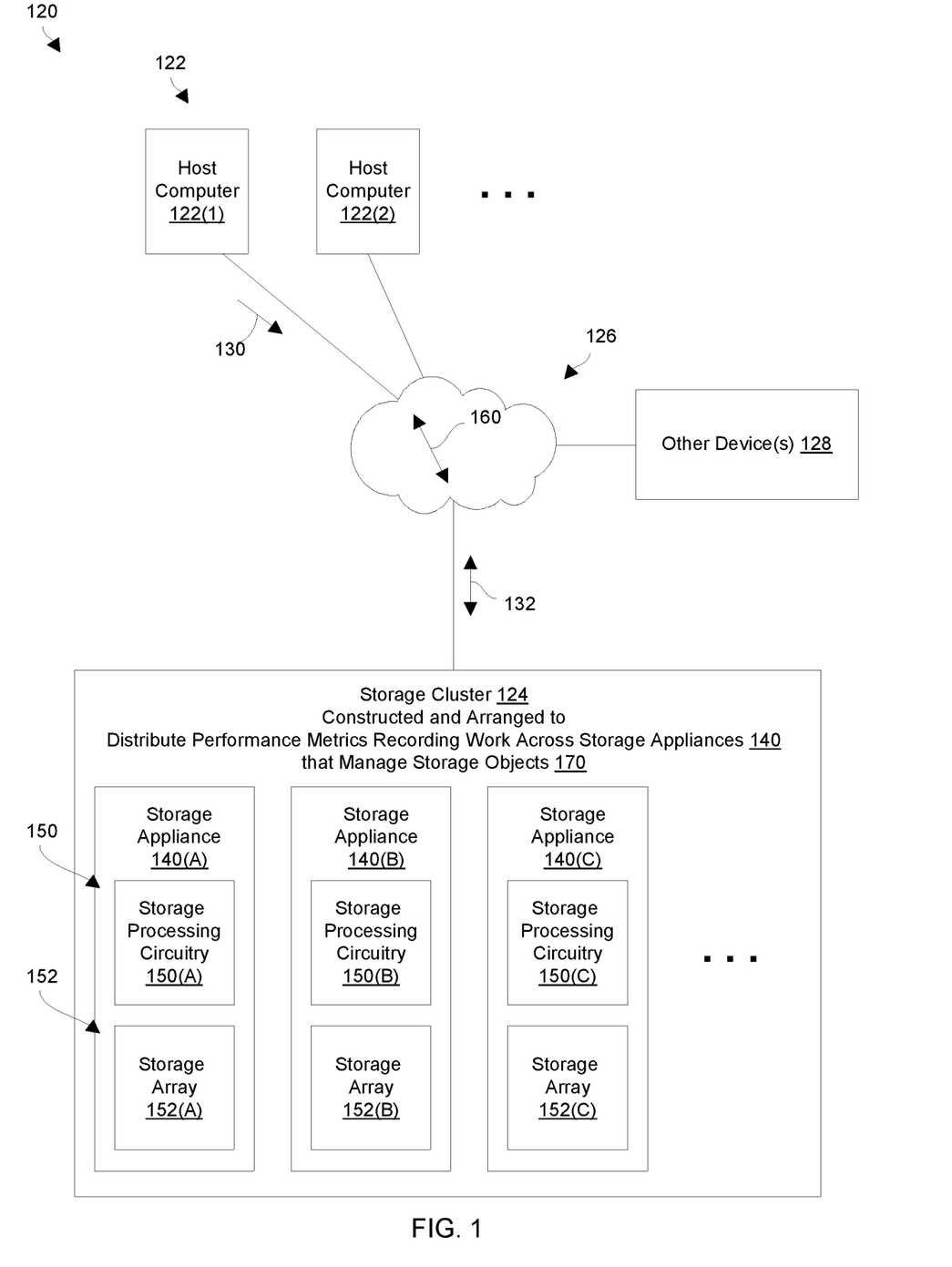
FIG. 1 is a block diagram which illustrates a data storage environment that distributes storage cluster performance metrics recording work across storage appliances of a storage cluster in accordance with certain embodiments.

FIG. 1 shows a data storage environment 120 having a storage cluster which distributes storage cluster performance metrics recording work across storage appliances of the storage cluster in accordance with certain embodiments. As will be explained in further detail later, the data storage environment 120 may utilize a migration status table to avoid processing duplicate sets of performance metrics during storage object migration thus enabling reliable performance analysis.

As shown in FIG. 1, the data storage environment 120 includes host computers 122(1), 122(2), . . . (collectively, host computers 122), a storage cluster 124, a communications medium 126, and perhaps other devices 128.

The host computers 122 are constructed and arranged to perform useful work. For example, one or more of the host computers 122 may operate as a file server, a web server, an email server, an enterprise server, a database server, a transaction server, combinations thereof, etc. which provides host input/output (I/O) requests 130 to the storage cluster 124. In this context, the host computers 122 may provide a variety of different I/O requests 130 (e.g., block and/or file based write commands, block and/or file based read commands, combinations thereof, etc.) that direct the storage cluster 124 to store host data 132 within and retrieve host data 132 from storage (e.g., primary storage or main memory, secondary storage, tiered storage, combinations thereof, etc.).

The storage cluster 124 includes a set of storage appliances 140 which is constructed and arranged to perform data storage operations (e.g., to store and retrieve the host data 132 on behalf of the host computers 122). For effective fault tolerance and/or load balancing, the set of storage appliances 140 includes at least two storage appliances 140 (e.g., two, three, four, etc.).

The storage appliances 140 include storage processing circuitry 150 and storage arrays 152. Along these lines, the storage appliance 140(A) includes storage processing circuitry 150(A) and a storage array 152(A). Similarly, the storage appliance 140(B) includes storage processing circuitry 150(B) and a storage array 152(B). Likewise, the storage appliance 140(C) includes storage processing circuitry 150(C) and a storage array 152(C), and so on. The storage cluster 124 is illustrated as having at least three storage appliances 140 by way of example only.

The storage processing circuitry 150 may include one or more storage processors (SPs) or engines, data movers, director boards, blades, I/O modules, storage device controllers, switches, other hardware, combinations thereof, and so on. With at least two hardware SPs, the storage processing circuitry 150 of a storage appliance 140 enjoys fault tolerance and is capable of load balancing.

The storage arrays 152 include storage devices (e.g., NVRAM devices, SSDs, hard disk drives, combinations thereof, etc.). When different types of storage devices are available, the storage arrays 152 are capable of providing different storage tiers having different storage characteristics (e.g., different access times, different storage capacities, different types of data protection schemes, combinations thereof, etc.). Additionally, the storage devices may be separated into different groups to provide different fault domains where the failure of a particular storage device only impacts data within a particular fault domain.

The communications medium 126 is constructed and arranged to connect the various components of the data storage environment 120 together to enable these components to exchange electronic signals 160 (e.g., see the double arrow 160). At least a portion of the communications medium 126 is illustrated as a cloud to indicate that the communications medium 126 is capable of having a variety of different topologies including backbone, hub-and-spoke, loop, irregular, combinations thereof, and so on. Along these lines, the communications medium 126 may include copper-based data communications devices and cabling, fiber optic devices and cabling, wireless devices, combinations thereof, etc. Furthermore, the communications medium 126 is capable of supporting LAN-based communications, SAN-based communications, cellular communications, WAN-based communications, distributed infrastructure communications, other topologies, combinations thereof, etc.

The other devices 128 represent other possible componentry of the data storage environment 120. Along these lines, the other devices 128 may include remote data storage equipment that provides data to and/or receives data from the storage cluster 124 (e.g., replication arrays, backup and/or archiving equipment, service processors and/or management/control devices, etc.).

During operation, the storage cluster 124 performs data storage operations in response to the I/O requests 130 from the host computers 122. It should be appreciated that the storage cluster 124 may provide a variety of specialized services and features such as deduplication, compression, encryption, garbage collection, tiering, snapshotting, backup/archival services, replication and/or failover to other data storage equipment, data recovery, and so on. In some arrangements, the storage cluster 124 itself may run host-based applications thus providing a platform with integrated host services.

During such operation, the storage cluster 124 may handle (or treat) various storage-related constructs in an objectized manner, i.e., as storage objects. Examples of such storage object constructs, which are referred to hereinafter as storage objects 170, include virtual machines (VMs), virtual volumes (VVOLs), logical units of storage (LUNs), and the like. Other constructs may be treated as storage objects as well such as file systems, files, sections of memory, complex data structures, combinations thereof, and so on.

In accordance with certain embodiments, the storage cluster 124 protects the host data 132 using one or more Redundant Array of Independent Disks (RAID) level protection schemes. Suitable RAID levels include, by way of example only, RAID 1, RAID 5, RAID 6, RAID 10, etc.

In accordance with certain embodiments, one or more storage appliances 140 of the storage cluster 124 utilizes a mapped-RAID architecture. For example; the storage appliance 140(A) may implement RAID5(4+1) within a RAID resiliency set (RRS) (i.e., a first fault domain) having many storage devices (e.g., six, eight, 25, 64, etc.). The storage appliance 140(A) may further provide other RRSs with the same or different RAID levels. Likewise, other storage appliances 140 may provide similar RRSs.

While the storage cluster 124 performs data storage operations on behalf of the host computers 122, the storage cluster 124 records performance metrics. In particular, the metrics recording work is distributed across the storage appliances 140 such that one storage appliance 140 does not perform all of the recording work. Along these lines, the storage appliances 140 individually record appliance-specific performance metrics relating to locally owned (or managed) storage objects 170 into a local appliance database. There may also be a primary storage appliance 140 (i.e., a designated storage appliance 140) that records cluster metrics relating to the overall cluster into a cluster database. Such distribution of metrics recording work among the multiple appliances 140 provides better load balancing and improves scalability. Further details of such metrics recording and processing will now be provided with reference to FIG. 2.

Figure 2:
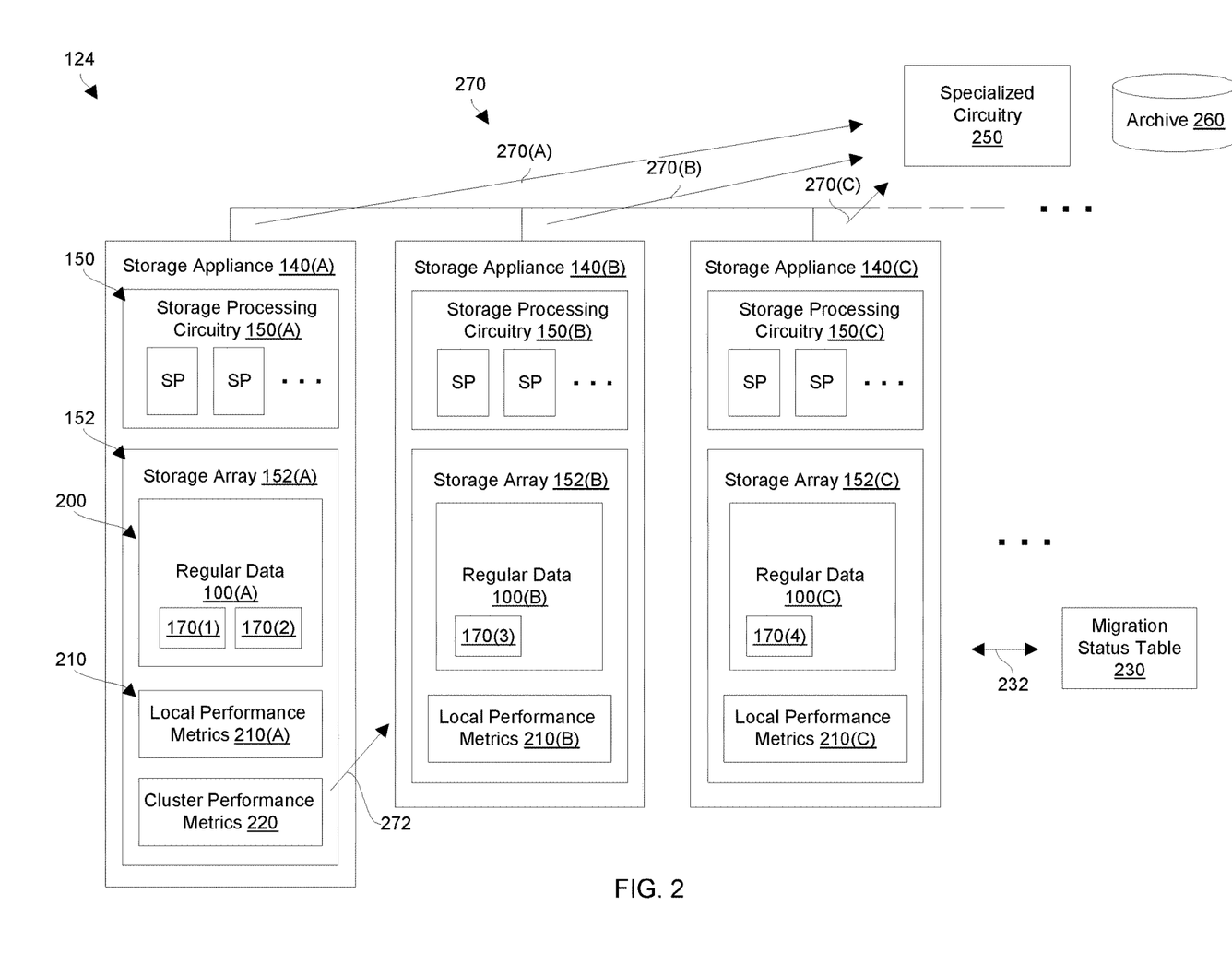
FIG. 2 is a block diagram which illustrates certain details of the storage cluster in accordance with certain embodiments.

FIG. 2 shows certain details of a storage cluster 124 in accordance with certain embodiments (also see FIG. 1). As shown, the storage processing circuitry 150 of each storage appliance 140 of the storage cluster 124 includes multiple SPs. Additionally, the storage array 152 of each storage appliance 140 stores regular data 200 (also see the host data 132 of FIG. 1) and local performance metrics 210. Furthermore, one of the storage appliances of the storage cluster 124 is designated for storing cluster performance metrics 220.

During operation, the SPs of the storage processing circuitry 150 of the storage appliances 140 process I/O requests 130 (i.e., write and read commands) from one or more host computers 122 (also see FIG. 1) in a fault tolerant and/or load balanced manner During such operation, the storage processing circuitry 150 records performance metrics which, when subsequently evaluated, provides insights to control further operation of the storage cluster 124.

In accordance with certain embodiments, the storage cluster 124 refers to various storage-related constructs such as VMs, VVOLs, LUNs, etc. as storage objects 170 (FIG. 1). As shown by way of example only in FIG. 2, the regular data 200(A) within the storage array 152(A) of the storage appliance 140(A) includes storage objects 170(1) and 170(2). Additionally, the regular data 200(B) within the storage array 152(B) of the storage appliance 140(B) includes a storage object 170(3). Furthermore, the regular data 200(C) within the storage array 152(C) of the storage appliance 140(C) includes a storage object 170(C).

It should be appreciated that the arrangement described above is provided by way of example only, and that other arrangements are possible. Along these lines, the storage cluster 124 may include a different number of storage appliances 140 (e.g., two, four, five, etc.). Additionally, the storage object situation within the storage cluster 124 may be different where each storage array 152 includes any number of storage objects 170 at a particular time of operation.

Moreover, it should be understood that the storage cluster 124 may migrate the storage objects 170 among the storage appliances 140 over time. Along these lines, suppose that a determination is made to migrate the storage object 170(2) (e.g., a VVOL) from the storage array 152(A) of the storage appliance 140(A) to the storage array 52(B) of the storage appliance 40(B). Such a determination may be made based on an automatically triggered evaluation (e.g., periodic, scheduled, event driven, combinations thereof, etc.) of the performance metrics 210, 220 recorded by the storage cluster 124. Additionally, such a determination may be targeted at improving current storage cluster performance, improving future storage cluster performance, freeing resources for one or more additional modifications to the storage cluster 124, freeing resources for a scheduled operation by the storage cluster 124, combinations thereof, and so on.

When the storage cluster 124 migrates a storage object 170 from one storage appliance 140 to another storage appliance 140, the storage cluster 124 maintains (e.g., stores and updates) a migration status table (MST) 230 to enable tracking of the migration operation over time. Access to the migration status table 230 by the storage appliances 140 is illustrated by the double arrow 232 in FIG. 2.

Below is an example format for an entry of the migration status table 230.

| Object ID | Source Node | Destination Node | State |
|---|---|---|---|

The Object ID field of the entry stores an object identifier that uniquely identifies a particular storage object 170 within the storage cluster 124. The Source Node field stores a storage appliance identifier that uniquely identifies a particular storage appliance 140 of the storage cluster 124 that serves as a source (or initial location) for the storage object 170. The Destination Node field stores a storage appliance identifier that uniquely identifies another storage appliance 140 of the storage cluster 124 that serves as a destination (or subsequent location) for the storage object 170. The State field stores a current migration state for the storage object 170. It should be understood that other fields are suitable as will for the MST entry such as a timestamp, the type of storage object 170 (e.g., VM, VVOL, etc.), and so on.

In accordance with certain embodiments, for each storage object 170 within the storage cluster 124, the storage processing circuitry 150 of the storage appliance 140 that currently manages (or owns) that storage object 170 is responsible for updating the migration state for that storage object 170 in the corresponding MST entry. Accordingly, the migration status table 230 reflects the current storage object migration situation within the storage cluster 124. However, the recording work is distributed among multiple storage appliances 140 rather than a single storage appliance 140 thus improving scalability.

Moreover, it should be appreciated that the responsible manager (or owner) of the storage object 170 may change over time if the storage object 170 migrates across storage appliances 140. Along these lines, when a storage object 170 migrates from one storage appliance 140 to another storage appliance 140, the storage appliance 140 that currently manages the storage object updates the entry corresponding to the storage object 170 in the migration status table 230 to indicate that the migrate state of the storage object 170 is "PENDING" thus indicating that the migration operation is in progress. Additionally, the storage appliance 140 that currently manages the storage object 170 may further update the entry corresponding to the storage object 170 in the migration status table 130 to indicate that the migrate state of the storage object 170 with "SUCCESS" thus indicating that the migration operation has properly completed. Furthermore, the storage appliance 40 that currently manages the storage object 170 may further update the entry corresponding to the storage object 170 in the migration status table 230 after a period of time has passed since the migration operation completed with "REMOVE" thus indicating that the entry is no longer needed. Other states are suitable for use as well such as "HALTED, "FAILED", etc. to identify other migration situations for the storage object 170.

It should be understood that a variety of formats are suitable for use by the migration status table 230. In some arrangements, the migration status table 230 has an entry that corresponds to each storage object 170 in the storage cluster 124 and the storage cluster 124 updates the state of an entry when the storage object 170 corresponding to that entry migrates. In other arrangements, the migration status table 230 takes the form of a historical log of entries. Other foiiiiats are suitable for use as well such as databases, linked lists, trees, and so on.

When the migration status table 230 takes the form of a historical log, a background service may routinely cleanup the migration status table 230 (e.g., consolidate entries, remove very old entries, etc.) to reduce the size of the migration status table 130. For example, the specialized circuitry 250 may wake up periodically (e.g, once an hour, a day, a week, etc.) and remove any entries from the migration status table 130 having a "REMOVE" state.

Although storage object migration may begin automatically (e.g., due to an event, based on a schedule, etc.), it should be further understood that storage object migration may be initiated manually. For example, a human operator may provide a command to the storage cluster 124 to manually migrate the storage object 170(2) from the storage array 152(A) of the storage appliance 140(A) to the storage array 152(B) of the storage appliance 140(B).

It should be further appreciated that storage object migrations may occur simultaneously. For example, while the storage object 170(2) migrates from the storage array 152 (A) of the storage appliance 140(A) to the storage array 152(B) of the storage appliance 140(B), one or more other storage objects 170 may migrate from one storage appliance 140 to another. Moreover, during such storage object movement within the storage cluster 124, the storage cluster 124 continues to process I/O requests 130 on behalf of one or more host computers 122.

During storage cluster operation, the performance metrics 210, 220 are recorded within the storage arrays 152. Such performance metrics 210, 220 may vary over time and are thus recorded in a time-based manner (e.g., with timestamps).

As mentioned earlier, rather than impose the performance metric recording work on only one component of the storage cluster 124 (e.g., a single storage application) which does not scale well, the performance metric recording work is distributed across the storage appliances 140. Such recording work distribution removes imposing the recording work on just one storage appliance 140 thus removing the threat of that storage appliance 140 becoming a bottleneck or overtasked.

Instead, each storage appliance 140 records performance metrics for the storage objects 170 managed (or owned) by that storage appliance 140. Such an arrangements provides fairer distribution of the recording work load and improves scalability. Examples of suitable performance metrics include I/Os per second (or IOPs), storage consumption, and processor utilization, among others.

It should be appreciated that when a storage object 170 migrates from a first storage appliance 140 to a second storage appliance 140, the performance metrics (which also may be treated as a storage object 170) migrates from the first storage appliance 140 to the second storage appliance 140. Accordingly, the performance metrics travel across storage appliances 140 with the storage objects 170 during migration.

The designated storage appliance 140 is constructed and arranged to record cluster performance metrics 220 pertaining to the storage cluster 124 as a whole. In accordance with certain embodiments, this task of recording the cluster performance metrics (e.g., aggregate IOPs for the storage cluster 124, aggregate storage consumption, aggregate processor utilization, etc.) may be migrated from a first storage appliance 140 to a second storage appliance 140. In such a situation, the cluster performance metrics 220 is moved from the first storage appliance 140 to the second storage appliance 140.

As shown in FIG. 2, specialized circuitry 250 is constructed and arranged to export the recorded performance metrics 210 from the storage arrays 152 to an archive 260 while the storage cluster 124 operates to process I/O requests 130 on behalf of one or more host computers 122 (FIG. 1). In accordance with certain embodiments, the specialized circuitry 250 performs such exporting periodically (e.g., every two minutes, every five minutes, every 10 minutes, every 15 minutes, etc.).

In accordance with certain embodiments, the specialized circuitry 250 is further constructed and arranged to perform an analysis of the archived performed metrics to provide insights to improving the operation of the storage cluster 124. Along these lines, suppose that a particular storage object 170 at a particular storage appliance 140 is not performing in accordance with certain requirements (e.g., low I/O latency at certain times due to high traffic, running out of capacity, combinations thereof, etc.) while other storage appliances 140 have excess resources. In such a situation, the specialized circuitry 250 may perform a migration operation (or may provide a migration recommendation that a human operator simply approves/initiates) which relocates the particular storage object 170 from the particular storage appliance 140 to a new storage appliance 140. Once the particular storage object is relocated to the new storage appliance 140, the particular storage object 170 may perform in accordance with the requirements. Accordingly, such an adjusting operation provides a modification to the storage cluster 124 in a manner that improves an operating characteristic such as performance of the particular storage object 170.

It should be appreciated that, while the storage cluster 124 processes I/O requests 130 on behalf of one or more host computers 122, the specialized circuitry 250 may perform performance metrics exporting, analysis, and/or adjusting operations in the background (e.g., in a manner that is transparent to the host computers 122). In particular, the specialized circuitry 250 provides a bulk metrics service by periodically exporting recorded performance metrics from the local performance metrics 210 and the cluster performance metrics 220 into the archive 260. Along these lines, in a processing run, the specialized circuitry 250 may export the local performance metrics 210 from the storage appliances 140 to the archive 260 one at a time: retrieving the local performance metrics 210(A) from the storage appliance 140(A) (arrow 270(A) in FIG. 2), retrieving the local performance metrics 210(B) from the storage appliance 140(B) (arrow 270(B), retrieving the local performance metrics 210(C) from the storage appliance 140(C) (arrow 270(C), and so on. Additionally, in the processing run, the specialized circuitry 250 may export the cluster performance metrics 220 from the designated storage appliance 140 (arrow 272).

Once the specialized circuitry 150 archives the performance metrics 210, 220 (arrows 270, 272), the specialized circuitry 250 may evaluate the performance metrics 210, 220 and/or adjust operation of the storage cluster 124 based on such an evaluation. In some embodiments the specialized circuitry 250 and/or the archive 260 resides within the storage cluster 124 (e.g., within a storage appliance 140). In other embodiments, the specialized circuitry 250 and/or the archive 260 is external to the storage cluster 124 (e.g., in a host computer 122, in another device 128, etc.). Further details will now be provided with reference to FIG. 3.

Figure 3:
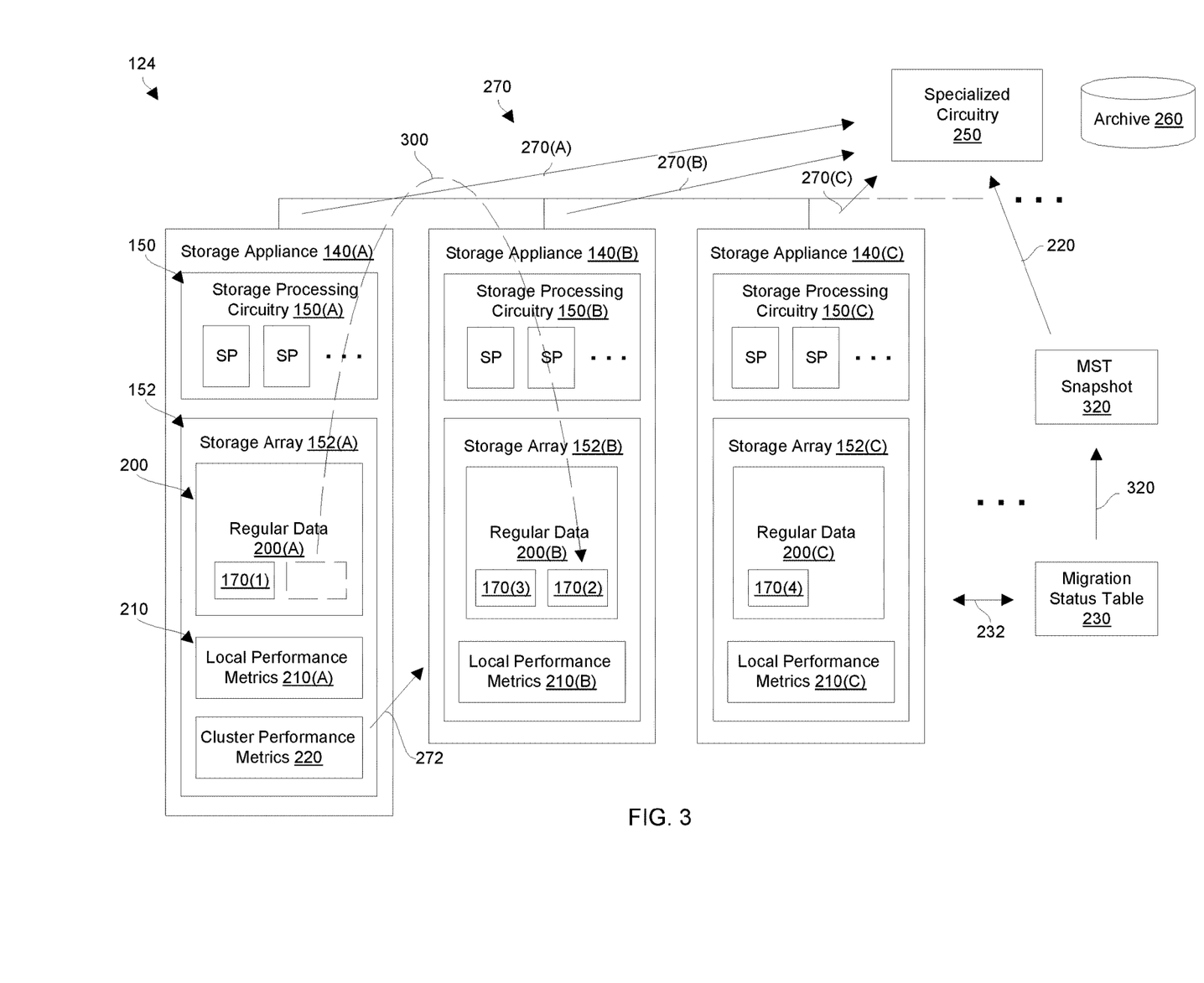
FIG. 3 is a block diagram which illustrates certain storage object migration details in accordance with certain embodiments.

FIG. 3 shows certain details for using the migration status table 230 in accordance with certain embodiments. Suppose that the storage cluster 124 migrates the storage object 170(2) from the storage appliance 140(A) to the storage appliance 140(B). That is, suppose that the storage object 170(2) initially resides within the storage array 152(A) of the storage appliance 140(A) as shown in FIG. 2. Then, as point time thereafter, the storage cluster 124 migrates (e.g., arrow 300) the storage object 170(2) from the storage array 152(A) of the storage appliance 140(A) to the storage array 152(B) of the storage appliance 140(B) as shown in FIG. 3.

When the storage cluster 124 begins this migration operation, the storage cluster 124 updates the migration status table 230 so that an entry of the migration status table 230 indicates that the storage object 170(2) is currently migrating. In particular, the storage cluster 124 provides the entry with a "PENDING" state. Below is an example entry in the migration status table 230 for the storage object 170(2).

| Object ID | Source Node | Destination Node | State |
|---|---|---|---|
| ef137ca3 | A | B | PENDING |

Here, "ef137ca3" is an example object identifier that uniquely identifies the storage object 170(2) within the storage cluster 124. Additionally, "A" is an example storage appliance identifier that uniquely identifies the storage appliance 140(A) within the storage cluster 124 as the initial location of the storage object 170(2). Similarly, "B" is an example storage appliance identifier that uniquely identifies the storage appliance 140(B) within the storage cluster 124 as the subsequent location of the storage object 170(B). Furthermore, "PENDING" indicates that the storage object 170(2) is in the state of migrating from the initial location to the subsequent location (i.e., that the migration operation has started but not finished).

When the storage cluster 124 properly completes the migration operation, the storage cluster 124 updates the migration status table 230 so that the entry of the migration status table 230 indicates that the storage object 170(2) has successfully migrated. In particular, the storage cluster 124 provides the entry with a "SUCCESS" state. Below is the example entry for the storage object 170(2) after the example entry is updated following proper completion of the migration operation.

| Object ID | Source Node | Destination Node | State |
|---|---|---|---|
| ef137ca3 | A | B | SUCCESS |

Here, "SUCCESS" indicates that the storage object 170(2) has successfully migrated from the initial location to the subsequent location (i.e., the migration operation has properly finished).

As mentioned earlier, the storage cluster 124 may migrate multiple storage objects 170 concurrently. During such multiple migration situations, multiple entries within the migration status table 230 reflect current migration states for the storage objects 170 that are migrating.

It should be understood that the specialized circuitry 250 that is constructed and arranged to export, analyze, and adjust operation of the storage cluster 124 is further capable of accessing the MST entries of the migration status table 230. Along these lines, the specialized circuitry 250 creates a migration status table (MST) snapshot 320 of the migration status table 230. The specialized circuitry 250 then accesses the entries from the MST snapshot 320.

It should be appreciated that, by accessing the MST snapshot 320 rather than the original migration status table 230 itself, there is no need to impose any locks, semaphores, and/or other access control mechanisms to preserve consistency of the entries. Accordingly, there are no MST contention issues that could otherwise cause operational delays/latency.

As explained above, the specialized circuitry 250 provides a bulk metrics service by periodically exporting the recorded performance metrics from the local performance metrics 210 and the cluster performance metrics 220 to the archive 260. For example, the bulk metrics service may wake up every five minutes to access such metrics 210, 220 in order to export newly recorded metrics to the archive 260. As a result, the archived metrics may be analyzed with an aim of improving cluster operation and/or performance. Along these lines, a human administrator may run a script that accesses the archived metrics to graphically plot a history of cluster operation over a period time.

It should be appreciated that, without certain safeguards, particular bulk metrics service operations may cause the archived metrics to inaccurately describe cluster operation. For example, suppose that as the storage cluster 124 performs a storage object migration operation in which a particular storage object such as a VM or a VVOL migrates (or moves) from a source storage appliance 140 to a destination storage appliance 140. During such operation, the recorded performance metrics associated with that particular object also migrate from the source storage appliance 140 to the destination storage appliance 140.

Further suppose that, during the storage object migration operation, the bulk metrics service wakes up (e.g., see the specialized circuitry 250 in FIG. 3) and accesses the performance metrics 210, 220 in order to export newly recorded metrics to the archive 260. In such a situation, if it were not for utilization of the migration status table 230, it could be possible for the bulk metrics service to export the recorded metrics for the migrating storage object 170 from the local performance metrics 210 of the source storage appliance 140 as well as the local performance metrics 210 of the destination storage appliance 140. That is, the recorded metrics for the associated with the particular storage object 170 could otherwise be stored in the archive 260 twice. If the archive 260 had duplicate metrics, an evaluation operation and/or a graphical plot of the history for the particular storage object 170 would show multiple data points for the time of storage object migration and such multiple data points could be detrimental to an evaluation of the metrics for insights to improve operation of the storage cluster 124.

However, for a single storage object 170 that migrates from a first storage appliance 140 to a second storage appliance 140, the specialized circuitry 250 ensures that duplicate sets of metrics are not archived. Rather, even if performance metrics for a migrating storage object 170 reside in both the local performance metrics 210 of the first storage appliance 140 and the local performance metrics 210 of the second storage appliance 140, the specialized circuitry 250 stores the local performance metrics 210 from only one of the storage appliances 140.

To this end, after the specialized circuitry 250 creates the snapshot 320, the specialized circuitry 250 reads the entry for the storage object 170 from the snapshot 320. If the state of the migration operation is "PENDING", the specialized circuitry 250 exports the performance metrics for the storage object 170 from the local performance metrics 210 of the storage appliance 140 identified as the source node (or simply source). That is, the specialized circuitry 250 disregards the performance metrics for the storage object 170 from the local performance metrics 210 of the storage appliance 140 identified as the destination node (or simply destination). Accordingly, while the state of the migration operation is "PENDING" for the storage object 170, the specialized circuitry 250 exports just one set of performance metrics for the storage object 170, i.e., the performance metrics from the first storage appliance 140.

However, if the state of the migration operation is "SUCCESS", the specialized circuitry 250 exports the performance metrics for the storage object 170 from the local performance metrics 210 of the storage appliance 140 identified as the destination node (or simply destination). That is, the specialized circuitry 250 disregards the performance metrics for the storage object 70 from the local performance metrics 110 of the storage appliance 40 identified as the source. Accordingly, while the state of the migration operation is "SUCCESS" for the storage object 170, the specialized circuitry 250 again exports just one set of performance metrics for the storage object 170, i.e., the performance metrics from the second storage appliance 140.

As a result of exporting just one set of performance metrics for the storage object 170, any evaluation of the exported performance metrics will not be inadvertently based on multiple sets. Thus, evaluation will be reliable, and any adjustments to the operation of the storage cluster 124 based on the evaluation will be sound, i.e., based on accurate information. Further details will now be provided with reference to FIG. 4.

Figure 4:
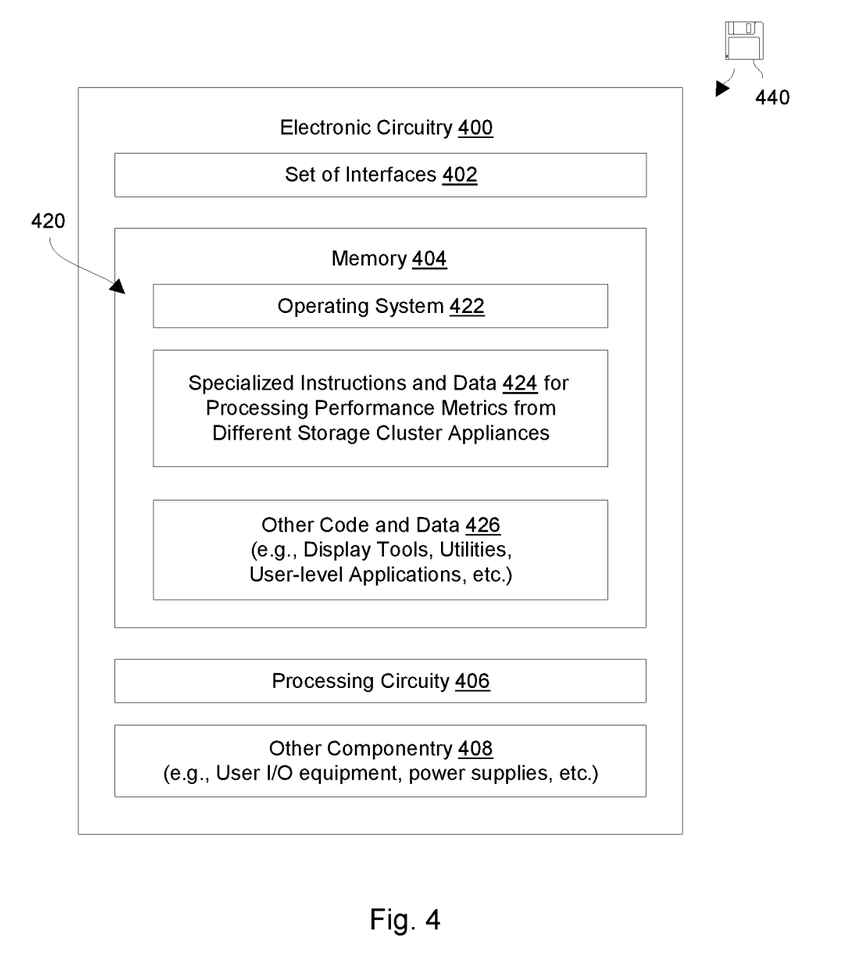
FIG. 4 is a block diagram which illustrates certain electronic circuitry details in accordance with certain embodiments.

FIG. 4 shows electronic circuitry 400 which is suitable for use as at least a portion of the specialized circuitry 250 (also see FIGS. 2 and 3) in accordance with certain embodiments. The electronic circuitry 400 includes a set of interfaces 402, memory 404, processing circuitry 406, and other circuitry (or componentry) 408.

The set of interfaces 402 is constructed and arranged to connect the electronic circuitry 400 to the communications medium 126 (also see FIG. 1) to enable communications with other devices of the data storage environment 120 (e.g., the host computers 122, the storage cluster 124, combinations thereof, etc.). Such communications may be IP-based, SAN-based, cellular-based, cable-based, fiber-optic based, wireless, cloud-based, combinations thereof, and so on. Accordingly, the set of interfaces 402 may include one or more host interfaces (e.g., a computer network interface, a fibre-channel interface, etc.), one or more storage device interfaces (e.g., a host adapter or HBA, etc.), and other interfaces. As a result, the set of interfaces 402 enables the electronic circuitry 400 to robustly and reliably communicate with other external apparatus.

The memory 404 is intended to represent both volatile storage (e.g., DRAM, SRAM, etc.) and non-volatile storage (e.g., flash memory, magnetic memory, etc.). The memory 404 stores a variety of software constructs 420 including an operating system 422, specialized instructions and data 424, and other code and data 426. The operating system 422 refers to particular control code such as a kernel to manage computerized resources (e.g., processor cycles, memory space, etc.), drivers (e.g., an I/O stack), and so on. The specialized instructions and data 424 refers to particular instructions for exporting performance metrics from the storage cluster 124 to the archive 260, evaluating the performance metrics from the archive 260, and/or adjusting operation of the storage cluster 124 based on such evaluation. In some arrangements, the specialized instructions and data 424 is tightly integrated with or part of the operating system 422 itself. The other code and data 426 refers to applications and/or routines to provide additional operations and services (e.g., display tools, etc.), user-level applications, administrative tools, utilities, and so on.

The processing circuitry 406 is constructed and arranged to operate in accordance with the various software constructs 420 stored in the memory 404. As is explained in further detail herein, the processing circuitry 406 executes the operating system 422 and the specialized code 424 to form the specialized circuitry 250 which performs improved operations. In some embodiments, the processing circuitry 406 and other software constructs further forms the storage processing circuitry 150 that robustly and reliably manages host data on behalf of a set of host computers 122 (also see FIG. 1). Such processing circuitry 406 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on.

In the context of one or more processors executing software, a computer program product 440 is capable of delivering all or portions of the software constructs 420 to the electronic circuitry 300. In particular, the computer program product 440 has a non-transitory (or non-volatile) computer readable medium which stores a set of instructions that controls one or more operations of the electronic circuitry 400. Examples of suitable computer readable storage media include tangible articles of manufacture and apparatus which store instructions in a non-volatile manner such as DVD, CD-ROM, flash memory, disk memory, tape memory, and the like.

The other componentry 408 refers to other hardware of the electronic circuitry 400. Along these lines, the electronic circuitry 400 may include special user I/O equipment (e.g., a service processor, a device to graphically display renderings of the performance metrics, etc.), power supplies and battery backup units, auxiliary apparatuses, other specialized data storage componentry, etc.

It should be further understood that certain portions of the electronic circuitry 400 may reside together to form one or more storage controllers (or storage processors). In accordance with certain embodiments, the electronic circuitry 400 includes multiple storage controller devices for fault tolerance and/or load balancing purposes. Further details will now be provided with reference to FIG. 5.

Figure 5:
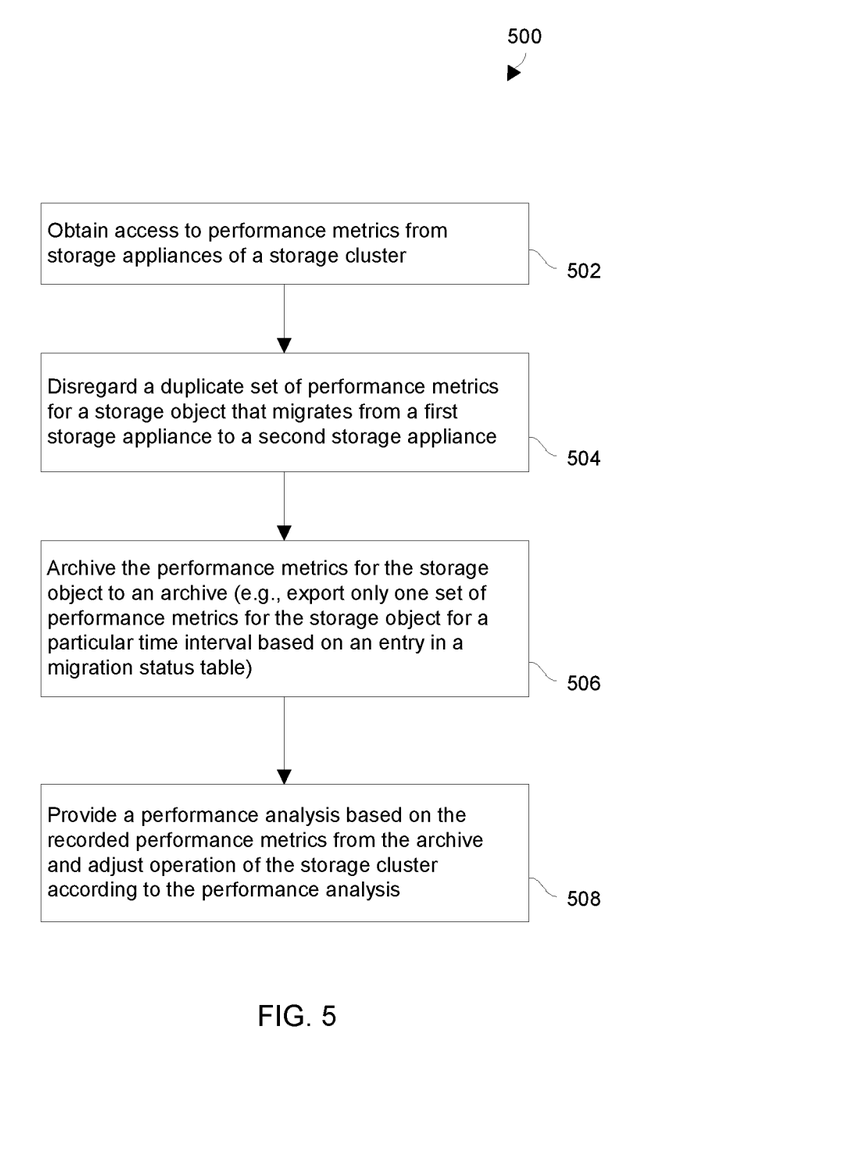
FIG. 5 is a flowchart which illustrates certain operational details in accordance with certain embodiments.

FIG. 5 shows a procedure 500 which is performed by specialized circuitry of the data storage environment 120 (FIG. 1) in accordance with certain embodiments. The procedure 500 enables the specialized circuitry to process storage cluster performance metrics reliably in a manner that ensures multiple sets of the same performance metrics will not be processed for a migrating storage object. Performance of one or more activities within the procedure 400 may be triggered periodically (e.g., every five minutes or some other interval).

At 502, the specialized circuitry obtains access to performance metrics from storage appliances of a storage cluster. Along these lines, the specialized circuitry is able to connect with the storage appliances in order to export local performance metrics to an archive. As mentioned earlier in connection with FIGS. 2 and 3, the performance metrics identifies performance for storage objects managed by the storage appliances.

At 504, the specialized circuitry, after access to the performance metrics is obtained, disregards a duplicate set of performance metrics for a storage object that migrates from a first storage appliance of the storage cluster to a second storage appliance of the storage cluster. Here, the specialized circuitry avoids accessing multiple sets of the performance metrics covering the same time interval for the storage object that migrates. Instead, based on an entry within a migration status table, the specialized circuitry ignores the duplicate set of performance metrics for the storage object.

At 506, the specialized circuitry, after the duplicate set of performance metrics is disregarded, archives the performance metrics to an archive. Here, the specialized circuitry exports only one set of performance metrics for the storage object to the archive for a particular time interval based on an entry in the migration status table.

At 508, in accordance with certain embodiments, the specialized circuitry provides a performance analysis based on the performance metrics from the archive. Additionally, in accordance with certain embodiments, the specialized circuitry adjusts operation of the storage cluster according to the performance analysis.

In some arrangements, the performance analysis includes a storage appliance loading assessment. Accordingly, the adjustment operation may involve rebalancing the storage objects across the storage appliances based on the storage appliance loading assessment.

In some arrangements, the performance analysis includes a storage appliance resource assessment. Accordingly, the adjustment operation may involve locating a new storage object among the storage appliances based on the storage appliance resource assessment.

Other activities are suitable for use in 508 or in combination with 508. For example, performance aspects for one or more storage objects or even the storage cluster as a whole may be displayed graphically to a human user (e.g., an administrator or storage cluster operator). As another example, performance aspects for one or more storage objects or even the storage cluster as a whole may be used to identify issues, deficiencies, problems, etc. for rectification within the storage cluster, and so on. Further details will now be provided with reference to FIG. 6.

Figure 6:
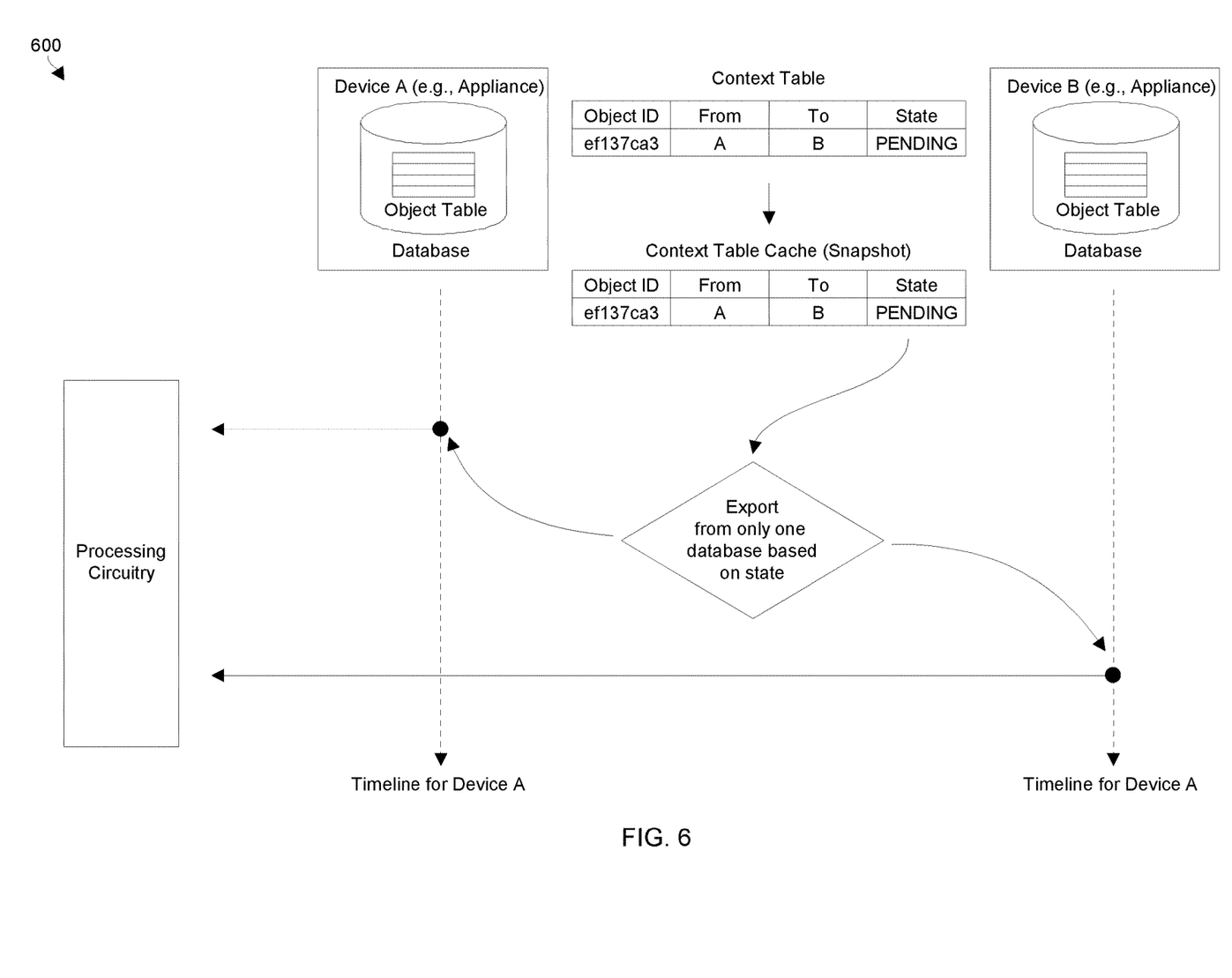
FIG. 6 is a block diagram which illustrates certain details for a general policy that avoids inadvertent processing of duplicate sets of information in accordance with certain embodiments.

FIG. 6 shows a diagram 600 having details for a general policy that avoids inadvertent processing of duplicate sets of information in accordance with certain embodiments. Within the diagram 600, there are multiple devices A, B with databases of information. For example, each device A, B may have a respective object table database and objects within the respective object table databases may migrate from one object table database to the other.

To avoid processing duplicate sets of information at a particular time (i.e., an entry for the same object from both object tables) at a particular time, the state of the object migration may be evaluated. Along these lines, suppose that the object is migrating from device A to device B. Early in the process, the migration state of the object may be set to "PENDING" and thus the policy directs the information to be exported from the database of device A and not from the database of device B. However, later in the process if the migration state changes from "PENDING" to "SUCCESS", the policy directs the information to be exported from the database of device B and not from the database of device A.

Accordingly, the processing circuitry receives only one set of information for further processing. As a result, such further processing is reliable and sound (i.e., not corrupted by a duplicate set of information).

As described above, improved techniques process storage cluster performance metrics. Certain techniques utilize a migration status table that tracks the progress of storage object migrations across storage appliances of a storage cluster. Migration status information within the migration status table may dictate whether to disregard certain performance metrics from a particular storage appliance in order to avoid duplicate sets of performance metrics due to storage object migration. Moreover, such a technique may utilize a snapshot of the migration status table rather than the migration status table itself, e.g., to prevent contention events, to avoid data inaccuracies, etc. With duplicate sets of performance metrics avoided, a performance analysis may be competently based on the performance metrics and operation of the storage cluster may be reliably adjusted according to the performance analysis.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 120 such as one or more host computers 122 and/or one or more other devices 128 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be understood that, in former approaches, it is possible to get duplicate object entries. Such duplicate object entries could make subsequent evaluations, analyses, etc. inaccurate.

However, in accordance with certain embodiments, improved techniques involve eliminating object metrics duplicates during migration in a distributed data collection system. Along these lines, an efficient cluster-based system has distributed metrics collection across appliances for load balancing for system objects. Such load balancing may involve object migration between different system components. Additionally, collected metrics data must be migrated for the components.

To avoid getting duplicate object entries, improved techniques involve using a migration status table to track the progress and using a snapshot of the migration status table for duplicate in accordance with certain embodiments. It should be appreciated that using a stale cached table rather than the original table during ongoing data collection will ensure there is no migration status change during a collection run. Rather, it is easy to know what data and on which appliance the data was collected.

In accordance with certain embodiments, the local database collection requires a foreign table of the cached objects migration table. That is, the foreign table may be a copy (or snapshot) and thus the same as the original foreign migration table.

It should be understood that tests for existing systems show that metrics collection for a cluster is faster than any object migration. Accordingly, in accordance with certain embodiments, there are no cases of an object migration starting and finishing during collection. Also, FROM metrics data shall be removed from the original appliance only if PENDING-SUCCESS-REMOVE time is bigger than query execution time.

It should be further understood that in other situations, additional enhancements are provided such as:
1. The data collection process is followed by a post-processing step to add missing data entries. The missing entries shall be found by comparing status differences (e.g., status change during collection) between the context table and the cached or copied context table.
2. Data removal from a source appliance is delayed by a time that is longer than the data collection time. Without tests, the delay time shall not be bigger than 20-30 seconds.
3. The cached or copied context table can be complemented by a repeatable read if the database supports certain advanced functionality such as PostgresSQL.

Moreover, it is possible that the bulk metrics service may miss archiving metrics for a migrating object. In such a situation, the possibility may occur on a system where bulk metrics collection time is greater than an object migration time.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of processing storage cluster performance metrics, the method comprising:
   obtaining access to performance metrics from storage appliances of a storage cluster, the performance metrics identifying performance for storage objects managed by the storage appliances;
   after access to the performance metrics is obtained, disregarding a duplicate set of performance metrics for a storage object that migrates from a first storage appliance of the storage cluster to a second storage appliance of the storage cluster; and
   after the duplicate set of performance metrics is disregarded, archiving the performance metrics to an archive.

2. A method as in claim 1 wherein the storage cluster maintains a migration status table that tracks progress of storage object migrations within the storage cluster; and
   wherein disregarding the duplicate set of performance metrics for the storage object includes:
      accessing a storage object migration entry corresponding to the storage object from the migration status table, the storage object migration entry identifying a migration status of the storage object, and
      disregarding the duplicate set of performance metrics for the storage object based on the migration status identified by the storage object migration entry.

3. A method as in claim 2 wherein the first storage appliance stores a first set of performance metrics for the storage object that migrates from the first storage appliance to the second storage appliance;
   wherein the second storage appliance stores a second set of performance metrics for the storage object that migrates from the first storage appliance to the second storage appliance; and
   wherein disregarding the duplicate set of performance metrics for the storage object based on the migration status identified by the storage object migration entry includes:
      ignoring, as the duplicate set of performance metrics for the storage object, one of the first set of performance metrics and the second set of performance metrics based on the migration status identified by the storage object migration entry.

4. A method as in claim 3 wherein the storage object migration entry includes a migration status field that defines (i) a pending state when the storage object is in the process of migrating from the first storage appliance to the second storage appliance, and (ii) a success state when the storage object has completed migration from the first storage appliance to the second storage appliance; and
   wherein ignoring one of the first set of performance metrics and the second set of performance metrics includes:
      retrieving the first set of performance metrics from the first storage appliance and neglecting the second set of performance metrics from the second storage appliance when the status field of the storage object migration entry defines the pending state, and
      retrieving the second set of performance metrics from the second storage appliance and neglecting the first set of performance metrics from the first storage appliance when the status field of the storage object migration entry defines the success state.

5. A method as in claim 4 wherein accessing the storage object migration entry corresponding to the storage object from the migration status table includes:
   creating a snapshot of the migration status table, and
   reading the storage object migration entry from the snapshot of the migration status table.

6. A method as in claim 1, further comprising:
   after archiving the performance metrics to the archive, providing a performance analysis based on the performance metrics from the archive.

7. A method as in claim 6, further comprising:
   adjusting operation of the storage cluster according to the performance analysis.

8. A method as in claim 7 wherein the performance analysis includes a storage appliance loading assessment; and
   wherein adjusting the operation of the storage cluster includes:
      rebalancing the storage objects across the storage appliances based on the storage appliance loading assessment.

9. A method as in claim 7 wherein the performance analysis includes a storage appliance resource assessment; and
   wherein adjusting the operation of the storage cluster includes:
      locating a new storage object among the storage appliances based on the storage appliance resource assessment.

10. A method as in claim 1 wherein the first storage appliance manages a first group of storage objects and maintains a first group of performance metrics identifying performance for the first group of storage objects;
   wherein the second storage appliance manages a second group of storage objects and maintains a second group of performance metrics identifying performance for the second group of storage objects; and
   wherein obtaining access to the performance metrics from the storage appliances of the storage cluster includes:
      acquiring access to the first group of performance metrics maintained by the first storage appliance for the first group of storage objects and the second group of performance metrics maintained by the second storage appliance for the second group of storage objects.

11. A method as in claim 10 wherein the first group of storage objects includes a first group of virtual machines;
   wherein the first storage appliance includes (i) first storage processing circuitry that runs the first group of virtual machines and (ii) a first storage array;
   wherein the second group of storage objects includes a second group of virtual machines;
   wherein the second storage appliance includes (i) second storage processing circuitry that runs the second group of virtual machines and (ii) a second storage array; and
   wherein acquiring access includes:
      obtaining access to (i) the first group of performance metrics from the first storage appliance, the first group of performance metrics identifying performance of the first group of virtual machines, and (ii) the second group of performance metrics from the second storage appliance, the second group of performance metrics identifying performance of the second group of virtual machines.

12. A method as in claim 10 wherein the first group of storage objects includes a first group of virtual volumes;
   wherein the first storage appliance includes (i) first storage processing circuitry and (ii) a first storage array that stores the first group of virtual volumes;
   wherein the second group of storage objects includes a second group of virtual volumes;
   wherein the second storage appliance includes (i) second storage processing circuitry and (ii) a second storage array that stores the second group of virtual volumes; and
   wherein acquiring access includes:
      obtaining access to (i) the first group of performance metrics from the first storage appliance, the first group of performance metrics identifying performance of the first group of virtual volumes, and (ii) the second group of performance metrics from the second storage appliance, the second group of performance metrics identifying performance of the second group of virtual volumes.

13. A method as in claim 1 wherein the first storage appliance has a first set of performance metrics for the storage object available for exporting;
   wherein the second storage appliance has a second set of performance metrics for the storage object available for exporting; and
   wherein disregarding the duplicate set of performance metrics for the storage object that migrates from the first storage appliance of the storage cluster to the second storage appliance of the storage cluster includes:

designating for exporting exactly one of the first set of performance metrics and the second set of performance metrics based on a current migration state of the storage object.

14. A method as in claim 13 wherein designating for exporting exactly one of the first set of performance metrics and the second set of performance metrics includes:
  in response to the current migration state of the storage object being pending due migration of the storage object from the first storage appliance to the second storage appliance being considered pending by the storage cluster, identifying the first set of performance metrics of the first storage appliance for exporting and not identifying the second set of performance metrics of the second storage appliance for exporting.

15. A method as in claim 13 wherein designating for exporting exactly one of the first set of performance metrics and the second set of performance metrics includes:
  in response to the current migration state of the storage object being success due migration of the storage object from the first storage appliance to the second storage appliance being considered successful by the storage cluster, identifying the second set of performance metrics of the second storage appliance for exporting and not identifying the first set of performance metrics of the first storage appliance for exporting.

16. Electronic circuitry, comprising:
  memory; and
  control circuitry coupled to the memory, the memory storing instructions which, when carried out by the control circuitry, cause the control circuitry to perform a method of:
    obtaining access to performance metrics from storage appliances of a storage cluster, the performance metrics identifying performance for storage objects managed by the storage appliances,
    after access to the performance metrics is obtained, disregarding a duplicate set of performance metrics for a storage object that migrates from a first storage appliance of the storage cluster to a second storage appliance of the storage cluster, and
    after the duplicate set of performance metrics is disregarded, archiving the performance metrics to an archive.

17. Electronic circuitry as in claim 16 wherein the storage cluster maintains a migration status table that tracks progress of storage object migrations within the storage cluster; and wherein disregarding the duplicate set of performance metrics for the storage object includes:
  accessing a storage object migration entry corresponding to the storage object from the migration status table, the storage object migration entry identifying a migration status of the storage object, and
  disregarding the duplicate set of performance metrics for the storage object based on the migration status identified by the storage object migration entry.

18. Electronic circuitry as in claim 16 wherein the first storage appliance manages a first group of storage objects and maintains a first group of performance metrics identifying performance for the first group of storage objects;
  wherein the second storage appliance manages a second group of storage objects and maintains a second group of performance metrics identifying performance for the second group of storage objects; and
  wherein obtaining access to the performance metrics from the storage appliances of the storage cluster includes:
    acquiring access to the first group of performance metrics maintained by the first storage appliance for the first group of storage objects and the second group of performance metrics maintained by the second storage appliance for the second group of storage objects.

19. Electronic circuitry as in claim 16 wherein the method further comprises:
  after archiving the performance metrics to the archive, providing a performance analysis based on the performance metrics from the archive.

20. A computer program product having a non-transitory computer readable medium which stores a set of instructions to process storage cluster performance metrics, the set of instructions, when carried out by computerized circuitry, causing the computerized circuitry to perform a method of:
  obtaining access to performance metrics from storage appliances of a storage cluster, the performance metrics identifying performance for storage objects managed by the storage appliances;
  after access to the performance metrics is obtained, disregarding a duplicate set of performance metrics for a storage object that migrates from a first storage appliance of the storage cluster to a second storage appliance of the storage cluster; and
  after the duplicate set of performance metrics is disregarded, archiving the performance metrics to an archive.

* * * * *